US009338338B2

(12) United States Patent
Song

(10) Patent No.: US 9,338,338 B2
(45) Date of Patent: May 10, 2016

(54) ELECTRONIC DEVICE AND METHOD OF CAMERA CONTROL

(71) Applicants: AMBIT MICROSYSTEMS (SHANGHAI) LTD., Shanghai (CN); HON HAI PRECISION INDUSTRY CO., LTD., New Taipei (TW)

(72) Inventor: Ai-Ning Song, Shanghai (CN)

(73) Assignees: AMBIT MICROSYSTEMS (SHANGHAI) LTD., Shanghai (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/486,561

(22) Filed: Sep. 15, 2014

(65) Prior Publication Data
US 2015/0312486 A1 Oct. 29, 2015

(30) Foreign Application Priority Data

Apr. 29, 2014 (CN) .......................... 2014 1 0177156

(51) Int. Cl.
*H04N 5/225* (2006.01)
*G03B 7/08* (2014.01)
*H04N 5/247* (2006.01)
*H04N 5/232* (2006.01)

(52) U.S. Cl.
CPC ................ *H04N 5/2258* (2013.01); *G03B 7/08* (2013.01); *H04N 5/23245* (2013.01); *H04N 5/247* (2013.01)

(58) Field of Classification Search
CPC ... H04N 5/2258; H04N 5/247; H04N 5/2351; G03B 7/08–7/0807
See application file for complete search history.

(56) References Cited

U.S. PATENT DOCUMENTS

| 5,172,220 A * | 12/1992 | Beis ................. | G08B 13/19626 348/262 |
| 2003/0020814 A1* | 1/2003 | Ono ...................... | H04N 5/225 348/220.1 |

FOREIGN PATENT DOCUMENTS

| CN | 101516154 | 8/2009 |
| CN | 101521696 | 9/2009 |
| CN | 102111558 | 7/2013 |
| TW | 200931952 | 7/2009 |

* cited by examiner

*Primary Examiner* — Paul Berardesca
(74) *Attorney, Agent, or Firm* — Novak Druce Connolly Bove + Quigg LLP

(57) ABSTRACT

An electronic device includes two cameras each with a light sensor. The electronic device uses the light sensor of one of the two cameras which is operational to detect an ambient luminance, and determines if the detected ambient luminance is less than a preset shading value. In response to the detected ambient luminance being less than the preset shading value, the electronic device interchanges the cameras to work. That is, the electronic device powers down the one of the two cameras which is operational and activating the other one of the two cameras.

6 Claims, 4 Drawing Sheets

ELECTRONIC DEVICE AND METHOD OF CAMERA CONTROL

FIELD

The disclosure relates to camera control, and especially relates to an electronic device and a method of camera control.

BACKGROUND

Nowadays, mobile phone, palm computer, tablet computer and other portable electronic products have become indispensable tools in daily life. There are multiple cameras using in an front panel and a rear panel. In a traditional way of interchanging multiple cameras of most products, users have to find commands in a related menu to interchange cameras.

BRIEF DESCRIPTION OF THE DRAWINGS

Implementations of the present technology will now be described, by way of example only, with reference to the attached figures, wherein.

DETAILED DESCRIPTION

Figure 1:
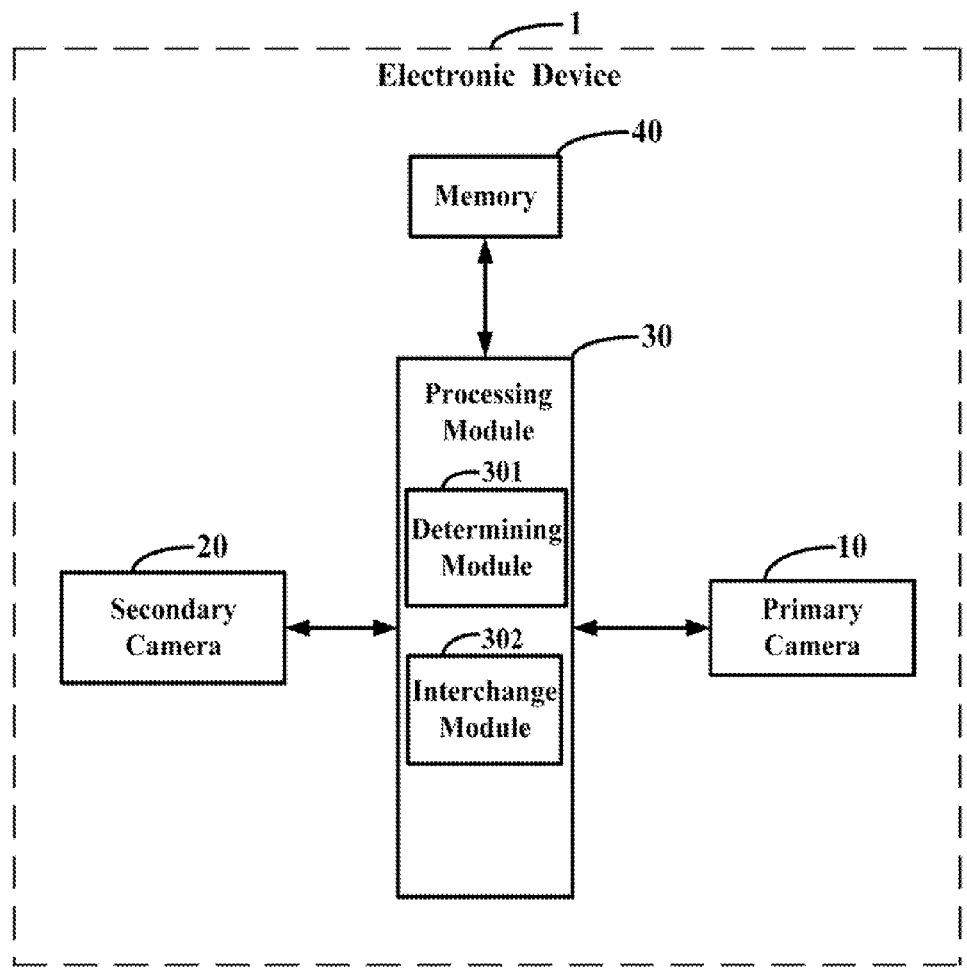
FIG. 1 is a schematic block diagram of one embodiment of an electronic device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like.

The present disclosure is described in relation a control method for a camera.

FIG. 1 is a schematic block diagram of one embodiment of an electronic device 1. As shown in FIG. 1, the electronic device 1 includes a primary camera 10, a secondary camera 20, a processing module 30 and a memory 40. The primary camera 10 and the secondary camera 20 are used to take videos or photos. The processing module 30 connects to the primary camera 10 and secondary camera 20 respectively to process feedback information from the primary camera 10 and the secondary camera 20. The memory 40 connects to the processing module 30 to store data.

Figure 2:
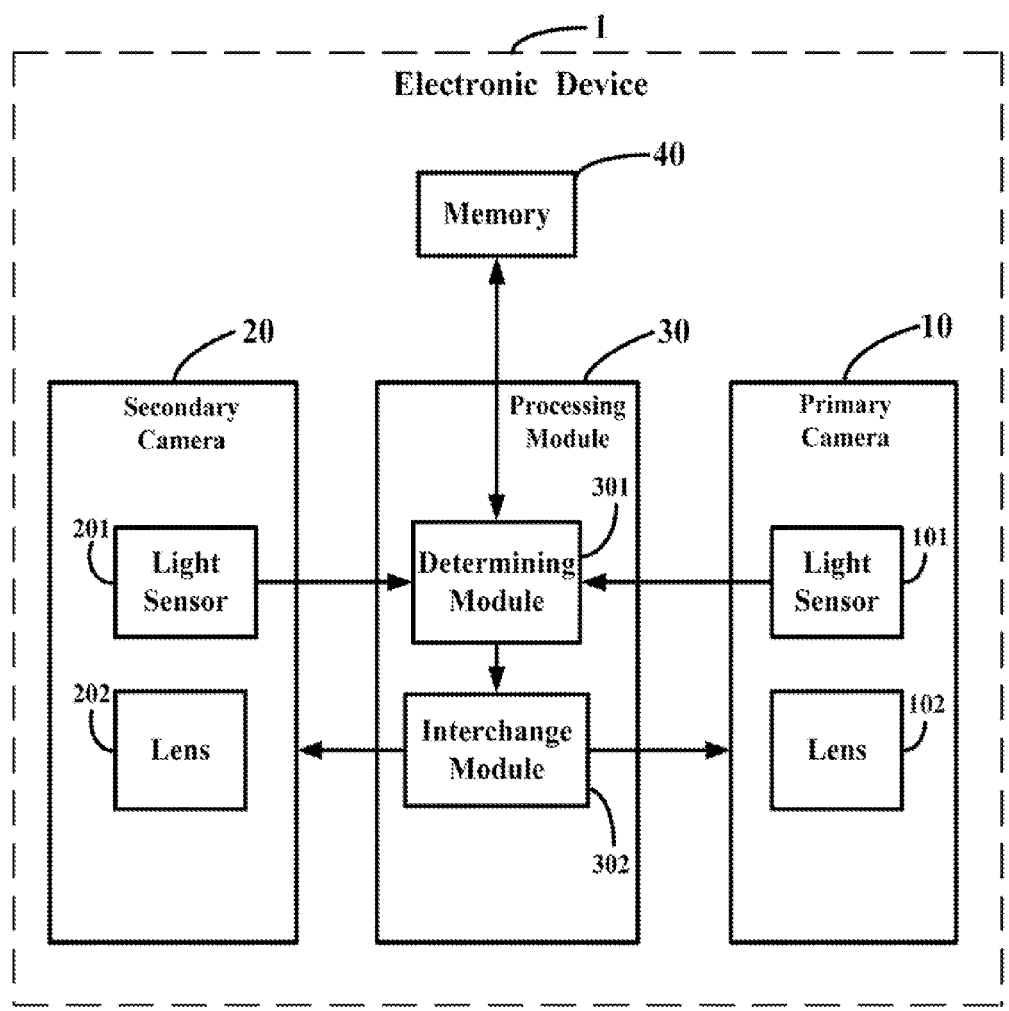
FIG. 2 is a function block diagram of FIG. 1.

FIG. 2 illustrates a function block diagram of FIG. 1. As shown in FIG. 2, the primary camera 10 includes a light sensor 101 and a lens 102. The light sensor 101 is used to detect an ambient luminance of the primary camera 10 at a preset time. The lens 102 is used to perform optical processing. The secondary camera 20 includes a light sensor 201 and a lens 202. The light sensor 201 is used to detect an ambient luminance of the secondary camera 20 at a preset time, the lens 202 is used to perform optical processing. The preset time can be manually or automatically set by users or a system. The preset time may be 0.2 seconds or 0.5 seconds or suitable other times.

In at least one embodiment, the light sensor 101 does not detect an ambient luminance until the primary camera 10 is operational. The light sensor 201 does not detect an ambient luminance until the secondary camera 20 is operational.

The processing module 30 includes a determining module 301 and an interchange module 302. The determining module 301 connects to the memory 40, the light sensor 101 and the light sensor 201 respectively to determine a status of an ambient luminance of the electronic device 1. The interchange module 302 connects to the primary camera 10, the secondary camera 20 and the determining module 301 respectively to receive the determining status and to control the primary camera 10 and the secondary camera 20.

In at least one embodiment, a preset brightness value and a preset shading value stored in the memory 40 are thresholds to determine the status of the ambient luminance, the preset brightness value and the preset shading value can be manually set by users or automatically set by a system.

In at least one embodiment, the primary camera 10 and the secondary camera 20 of the electronic device 1 are not operational at the same time, when the primary camera 10 is operational, the secondary camera 20 is not operational. When the secondary camera 20 is operational, the primary camera 10 is not operational as well.

When a user is operating a camera, the working camera detects the ambient luminance. In at least one embodiment, when in use, the primary camera 10 starts working at first, the secondary camera 20 remains off. In other embodiments, the secondary camera 20 can be operational.

Figure 3:
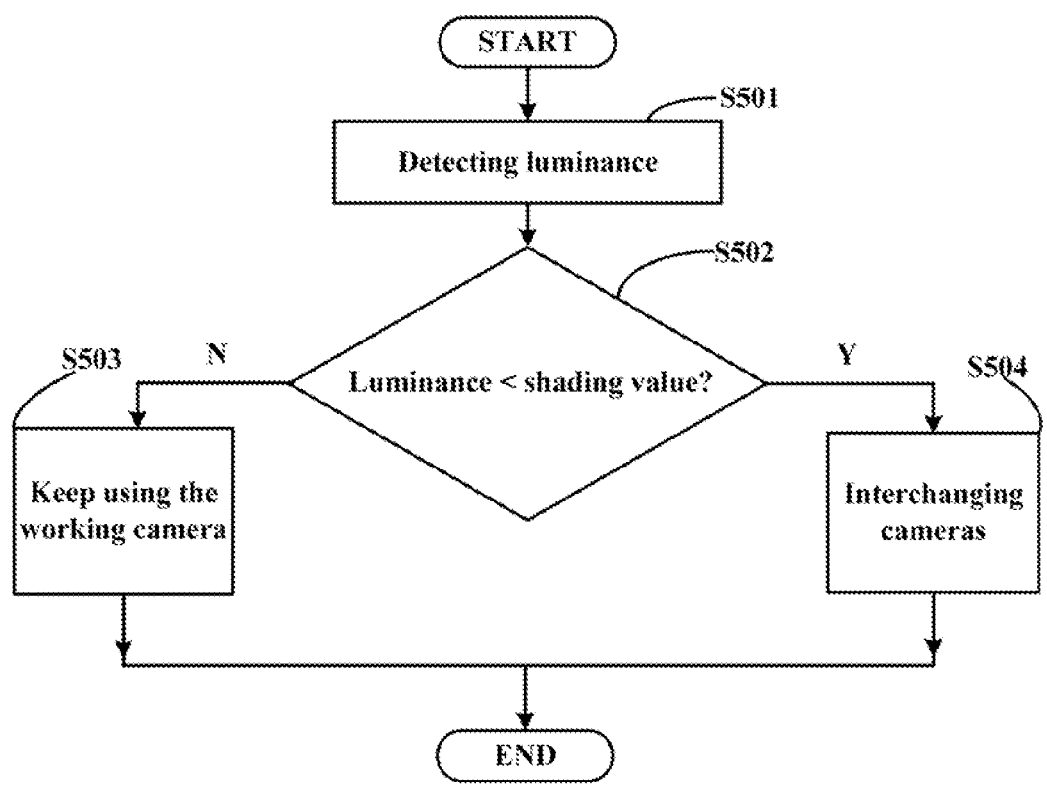
FIG. 3 is a flowchart of embodiment of a camera interchanging method.

FIG. 3 is a flowchart of one embodiment of a camera interchanging method.

In step S501, the operational camera starts to detect the ambient luminance and send the ambient luminance to the determining module 301. In the embodiment, the operational camera at first is the primary camera 10.

In step S502, the determining module 301 compares the ambient luminance with the preset shading value to determine whether the ambient luminance is less than the preset shading value.

In step S503, when the ambient luminance is not less than the preset shading value, the interchange module 302 keeps using the operational camera, in the embodiment, the interchange module 302 keeps using the primary camera 10.

In step S504, when the ambient luminance is less than the preset shading value, the interchange module 302 interchanges the operational camera in a predetermined time period, that is, the interchange module 302 is shutting down the operational camera and controls the camera that is not operational at the moment to work, in the embodiment, the primary camera 10 is powered down and the secondary camera 20 becomes operational.

Figure 4:
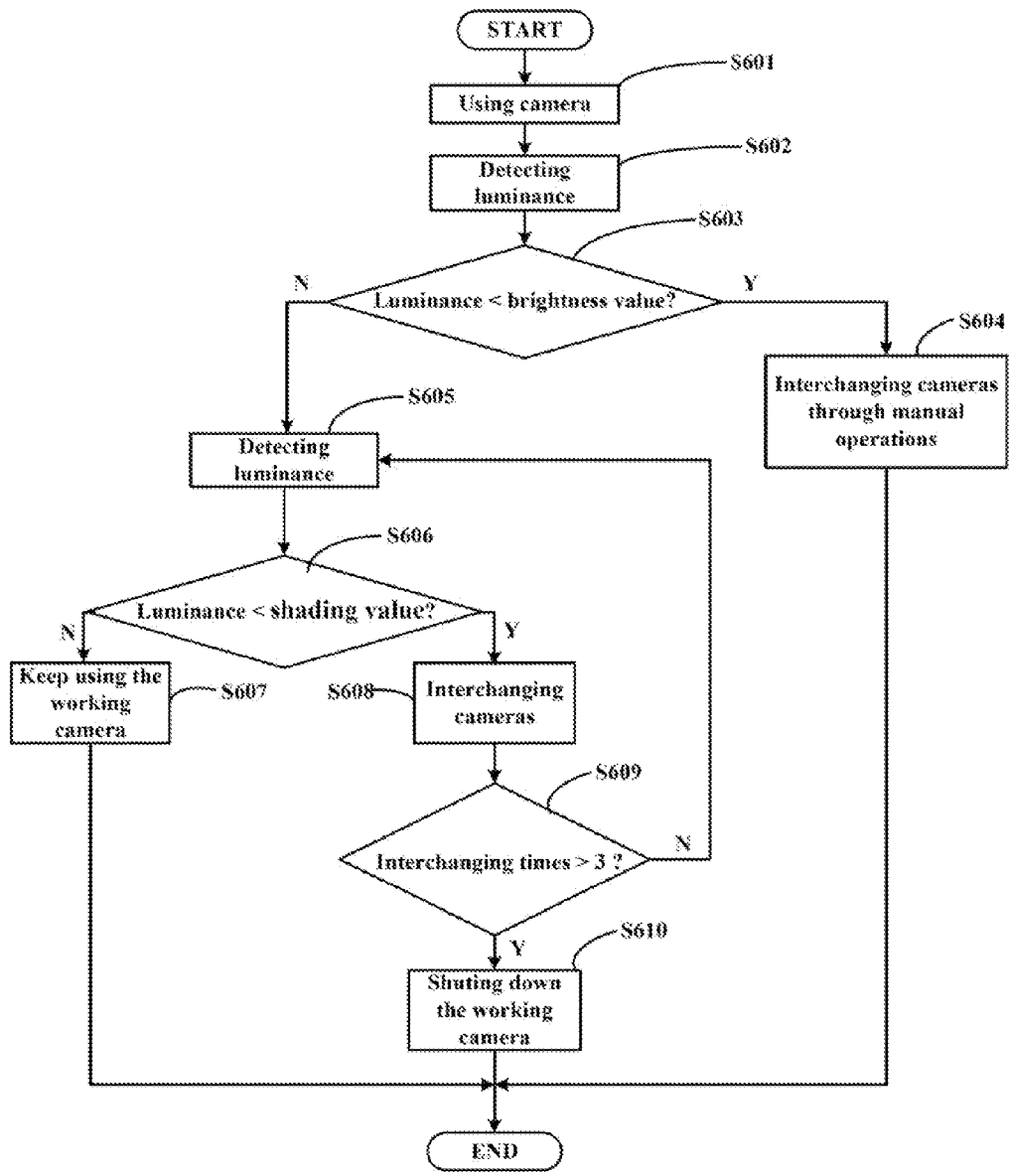
FIG. 4 is a flowchart of another embodiment of a camera interchanging method.

FIG. 4 is a flowchart of another embodiment of a camera interchanging method.

In step S601, when a user is operating a camera, the primary camera 10 starts to work.

In step S602, the light sensor 101 detects the ambient luminance of the primary camera 10 at a preset time through the lens 102, and then sends the ambient luminance to the determining module 301 of the processing module 30.

In step S603, the determining module 301 compares the ambient luminance with the preset brightness value whether or not the ambient luminance is less than the preset brightness value.

In step S604, when the ambient luminance is less than the preset brightness value, the interchange module 302 interchanges cameras according to manual operations on the electronic device of a user.

In step S605, when the ambient luminance is not less than the preset brightness value, the working camera continues to detect the ambient luminance, then sends the value of the ambient luminance detected to the determining module 301.

In step S606, the determining module 301 compares the ambient luminance with the preset shading value to determine whether the ambient luminance is less than the preset shading value.

In step S607, when the ambient luminance is not less than the preset shading value, the interchange module 302 keeps using the operational camera, in the embodiment, the interchange module 302 keeps using the primary camera 10.

In step S608, when the ambient luminance is less than the preset shading value, the interchange module 302 interchanges the operational camera in a time period, that is, the interchange module 302 is shutting down the operational camera and controls the camera that is not operational at the moment to work, in the embodiment, the primary camera 10 is powered down and the secondary camera 20 becomes operational.

In step S609, the interchange module 302 counts a number of interchanges between the two cameras, that is, the interchange module 302 counts a number of the times of the operational cameras interchange. If the number of interchange times is not greater than a preset number of interchange times, each time after an interchange of the cameras, the process will go back to step S605. If the number of interchange times is greater than the preset number of interchange times, the process will go to step S610 after interchanging the cameras. In the embodiment, the preset number of the interchange times is 3, in other embodiments, the preset number can be set to another integer.

In step S610, the interchange module 302 powers down the operational camera.

According to the electronic device 1 and the method of interchanging cameras, when a user covers the lens of the operational camera with an object such as a finger or other light-proof objects, the ambient luminance is less than the preset shading value, then the electronic device 1 will interchange cameras by powering down the operational camera and activating the camera which is not currently operational.

The foregoing disclosure of various embodiments has been presented for the purposes of illustration. It is not intended to be exhaustive or to limit the disclosure to the precise forms disclosed. Many variations and modifications of the embodiments described herein will be apparent to one of ordinary skill in the art in the light of the above disclosure. The scope of the disclosure is to be defined only by the claims appended hereto and their equivalents.

What is claimed is:

1. An electronic device, comprising:
    two cameras each with a light sensor, wherein one camera can be active and the other deactive, wherein the light sensor does not detect until the corresponding camera is operational;
    one or more processing modules;
    memory; and
    one or more programs, wherein the one or more programs are stored in the memory and configured to be executed by the one or more processing modules, the one or more programs comprise instructions for:
    detecting, at the active light sensor, an ambient luminance;
    determining if the detected ambient luminance is less than a preset shading value; and
    in response to the detected ambient luminance being less than the preset shading value, deactivating the active camera and activating the deactive camera;
    counting a number of interchange times of the two cameras within a predetermined time period;
    comparing whether the number of interchange times is greater than a preset number, and controlling the cameras according to the comparison result.

2. The electronic device as claimed in claim 1, wherein, before the determining if the ambient luminance is less than the preset shading value, the one or more programs further comprises instructions for:
    determining if the detected ambient luminance is less than a preset brightness value;
    in response to the detected ambient luminance being not less than the preset brightness value, determining if the ambient luminance being less than the preset shading value; and
    in response to the detected ambient luminance being less than the preset brightness value, controlling the two cameras to work according to manual operations on the electronic device of a user.

3. The electronic device as claimed in claim 1, wherein the one or more programs further comprises instructions for:
    in response to the number of interchange times being not greater than the preset number within the predetermined time period, interchanging the two cameras; and
    in response to the number of interchange times being greater than the preset number in the predetermined time period, powering down the two cameras.

4. A method of controlling cameras of an electronic device, the electronic device comprising two cameras each with a light sensor, wherein the light sensor does not detect until the corresponding camera is operational, the method comprising:
    detecting, at the active light sensor, an ambient luminance;
    determining if the detected ambient luminance is less than a preset shading value; and
    in response to the detected ambient luminance being less than the preset shading value, deactivating the active camera and activating the deactive camera;
    counting a number of interchange times of the two cameras within a predetermined time period;
    determining whether the number of interchange times is greater than a preset number, and controlling the cameras according to the comparison result.

5. The method as claimed in claim 4, wherein, before the determining if the ambient luminance is less than the preset shading value, the method further comprises:
    determining if the detected ambient luminance is less than a preset brightness value;

in response to the detected ambient luminance being not less than the preset brightness value, determining if the ambient luminance being less than the preset shading value; and in response to the detected ambient luminance being less than the preset brightness value, controlling to work the two cameras according to manual operations on the electronic device of a user.

6. The method as claimed in claim 4, further comprising:

in response to the number of interchange times being not greater than the preset number within the predetermined time period, interchanging the two cameras; and in response to the number of interchange times being greater than the preset number in the predetermined time period, powering down the two cameras.

* * * * *